(12) United States Patent
Barnes et al.

(10) Patent No.: US 6,218,979 B1
(45) Date of Patent: Apr. 17, 2001

(54) WIDE AREA TIME DOMAIN RADAR ARRAY

(75) Inventors: Mark A. Barnes, Madison; Larry W. Fullerton, Brownsboro, both of AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/332,503

(22) Filed: Jun. 14, 1999

(51) Int. Cl.⁷ .................................................. G01S 13/62
(52) U.S. Cl. ................................ 342/28; 342/22; 342/57; 342/58; 342/59
(58) Field of Search ............................. 342/22, 27, 28, 342/21, 57, 58, 59, 60, 176, 179, 190, 191, 195, 197, 194

(56) References Cited

U.S. PATENT DOCUMENTS

| | | | |
|---|---|---|---|
| 4,083,049 | * 4/1978 | Mattern et al. | 342/28 |
| 4,622,540 | * 11/1986 | Guscott et al. | 340/531 |
| 4,641,317 | 2/1987 | Fullerton | 375/1 |
| 4,727,593 | * 2/1988 | Goldstein | 455/605 |
| 4,743,906 | 5/1988 | Fullerton | 342/27 |
| 4,813,057 | 3/1989 | Fullerton | 375/37 |
| 4,907,001 | 3/1990 | Harmuth | 342/159 |
| 4,979,186 | 12/1990 | Fullerton | 375/23 |
| 5,057,846 | 10/1991 | Harmuth | 342/204 |
| 5,134,408 | 7/1992 | Harmuth | 342/21 |
| 5,148,174 | 9/1992 | Harmuth | 342/21 |
| 5,265,121 | * 11/1993 | Stewart | 375/99 |
| 5,361,070 | 11/1994 | McEwan | 342/21 |
| 5,363,108 | 11/1994 | Fullerton | 342/27 |
| 5,457,394 | 10/1995 | McEwan | 324/642 |
| 5,465,094 | 11/1995 | McEwan | 342/28 |
| 5,510,800 | 4/1996 | McEwan | 342/387 |
| 5,512,834 | 4/1996 | McEwan | 342/642 |
| 5,519,400 | 5/1996 | McEwan | 342/28 |
| 5,521,600 | 5/1996 | McEwan | 342/27 |
| 5,573,012 | 11/1996 | McEwan | 128/782 |
| 5,576,627 | 11/1996 | McEwan | 324/639 |
| 5,589,838 | 12/1996 | McEwan | 342/387 |
| 5,661,490 | 8/1997 | McEwan | 342/387 |
| 5,677,927 | 10/1997 | Fullerton et al. | 375/200 |
| 5,687,169 | 11/1997 | Fullerton | 370/324 |
| 5,757,320 | 5/1998 | McEwan | 342/387 |
| 5,766,208 | 6/1998 | McEwan | 600/595 |
| 5,767,953 | 6/1998 | McEwan | 356/5.01 |
| 5,774,091 | 6/1998 | McEwan | 342/387 |
| 5,832,035 | 11/1998 | Fullerton | 375/210 |
| 6,026,125 | * 2/2000 | Larrick, Jr. et al. | 375/295 |

OTHER PUBLICATIONS

Anderson, F. et al., "Ultra–wideband beamforming in sparse arrays,"*IEE Proceedings–H*, vol. 138, No. 4, Aug. 1991, 8 pages.

Skolnik, M.I., *Introduction to Radar Systems*, McGraw–Hill, 1980, pp. 553–560.

* cited by examiner

Primary Examiner—John B. Sotomayor
(74) Attorney, Agent, or Firm—Sterne, Kessler, Goldstein & Fox P.L.L.C.

(57) ABSTRACT

A system and method for high resolution radar imaging using a sparse array of time modulated ultra wideband (TM-UWB) radars. Two or more TM-UWB radars are arranged in a sparse array. Each TM-UWB radar transmits ultra wideband pulses that illuminate a target, and at least one receives the signal returns. The signal return data is processed according to the function being performed, such as imaging or motion detection. The TM-UWB radar array operates in several modes. In a first mode, each TM-UWB radar transmits and receives back scattering returns, and at least one TM-UWB radar receives forward scattering returns. In a second mode, each TM-UWB radar transmits but only one of the radars receives signal returns, both back and forward scattering. In a third mode, each TM-UWB radar transmits and receives back scattering signal returns, but neither receives forward scattering returns. TM-UWB radios can be used to perform other functions, such as handling communications between the radars and determining the distance separating one radar from another.

2 Claims, 11 Drawing Sheets

WIDE AREA TIME DOMAIN RADAR ARRAY

RELATED APPLICATIONS

This application is related to U.S. patent application Ser. No. 09/322,502 filed the same day as this application, Jun. 14, 1999, entitled "System and Method for Intrusion Detection Using a Time Domain Radar Array," which is incorporated herein by reference.

BACKGROUND OF THE INVENTION

1. Field of the Invention

The present invention relates generally to radar imaging, and more particularly to high resolution radar imaging using a sparse array of time modulated ultra wideband radars.

2. Related Art

Many applications today would benefit from high resolution radar imaging. For instance, law enforcement agencies often are confronted with hostage situations where armed intruders are barricaded inside a building. Officers on the scene generally have no means for determining the number and position of persons within the building, and are thus hampered in their efforts to resolve the situation. Similarly, law enforcement personnel planning a surprise raid on an armed compound would also greatly benefit from information related to the number and position of persons within. An imaging system that could be deployed in a covert manner outside the building for imaging personnel inside the building would therefore be of great assistance to law enforcement agencies.

Various motion sensing applications would also benefit from high resolution radar data. One example would be a motion sensor that is required to detect motion in a narrow hallway from a distant point in the building, while ignoring motion in the rooms adjacent to the hallway. Another example would be a home security motion sensor designed to detect intruders entering the house but to ignore movement within. Other examples include applications which require a combination of radar imaging and motion sensing. These combined imaging/motion sensing systems could be used to distinguish moving targets from stationary targets, or to provide an image of the building structure with a superimposed image showing the location of moving objects. Even more sophisticated systems could identify various targets based on specific movements, such as vital signs.

Conventional narrowband imaging devices are unable to provide this type of functionality. The applications described above require that the system be able to resolve closely spaced objects at a distance, inside a building. In order to achieve the necessary angular resolution, the pulses of electromagnetic radiation used to image the building must either be transmitted from multiple radiators (whether multiple antennas attached to a single source, or multiple sources) spaced wide distances apart, or the frequency of the transmitted radiation must be increased.

Neither approach is adequate. The spacing between radiating elements required to achieve the necessary resolution greatly exceeds one quarter of the operating wavelength (i.e., a sparse array) and therefore suffers from off-axis ambiguities. The resolution might be increased by increasing the operating frequency, but in doing so, decreases penetration and increases scattering. Narrowband pulses having sufficiently high frequency for the required resolution would be unable to penetrate a building. As a result, conventional narrowband systems cannot provide the functionality described for the above applications.

A need therefore exists for an improved system and method for high resolution, building penetrating, radar imaging.

SUMMARY OF THE INVENTION

Briefly stated, the present invention is directed to a system and method for high resolution radar imaging using a sparse array of time modulated ultra wideband (TM-UWB) radars. TM-UWB radars emit very short RF pulses of low duty cycle approaching Gaussian monocycle pulses with a tightly controlled pulse-to-pulse interval. Two or more of these TM-UWB radars are arranged in a sparse array, i.e., they are spaced at intervals of greater than one quarter wavelength. Each TM-UWB radar transmits ultra wideband pulses that illuminate a target, and at least one receives the signal returns. The signal return data is processed according to the function being performed, such as imaging or motion detection.

An advantage of the current invention is that ultra wideband (UWB) pulses are used. As used herein, UWB refers to very short RF pulses of low duty cycle ideally approaching a Gaussian Monocycle. Typically these pulses have a relative bandwidth (i.e. signal bandwidth/center frequency) which is greater than 25%. The ultra wideband nature of these pulses improves both angle and range resolution, which results in improved performance (e.g., a clearer picture, more sensitive motion detection). The term "wavelength", as used herein in conjunction with ultra wideband systems, refers to the wavelength corresponding to the center frequency of the ultra wideband pulse.

Another advantage of the current invention is that the TM-UWB radars are arranged in a sparse array, which results in greatly improved angular resolution. Angular resolution is a function of the width of the TM-UWB radar array, i.e., the wider the array, the greater the angular resolution. Conventional narrowband radars arranged in a sparse array suffer off-axis ambiguities, and are therefore not practical. However, the UWB pulses transmitted by the TM-UWB radars are sufficiently short in duration (with very few sidelobes) that the radars can be used in a sparse array configuration without off-axis ambiguities. Furthermore, range ambiguities are cured by time-encoding the sequence of transmitted TM-UWB pulses.

Another advantage of the current invention is that high angular resolution may be achieved at a low center frequency. Because the transmitted UWB pulses have a large relative bandwidth, and because the radar array is wide, a lower center frequency can be maintained and still achieve a high angular resolution. Operating at a lower center frequency relaxes the timing requirements of the system, which makes it easier to achieve synchronization between the radars, and results in less complex, less expensive implementations. A low center frequency also results in UWB pulses that are able to better penetrate lossy materials and withstand weather effects.

A feature of the current invention is that the TM-UWB radar array operates in several modes. In a first mode, each TM-UWB radar transmits and receives back scattering returns, and at least one TM-UWB radar receives forward scattering returns. In a second mode, each TM-UWB radar transmits but only one of the radars receives signal returns, both back and forward scattering. In a third mode, each TM-UWB radar transmits and receives back scattering signal returns, but neither receives forward scattering returns.

Another feature of the current invention is that TM-UWB radios can be used to perform other functions, such as handling communications between the radars and determining the distance separating one radar from another. Using a single TM-UWB radio to perform these functions results in a cost savings. Further, by using a single TM-UWB radar for transmitting UWB pulses and handling inter-radar communications the system achieves synchronization without additional cost.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Overview of the Invention

The present invention is directed to a system and method for high resolution radar imaging using a sparse array of TM-UWB radars. TM-UWB (or impulse) radio and radar technology was first fully described in a series of patents, including U.S. Pat. No. 4,641,317 (issued Feb. 3, 1987), U.S. Pat. No. 4,743,906 (issued May 10, 1988), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of TM-UWB patents include U.S. Pat. No. 5,677,927 (issued Oct. 14, 1997), U.S. Pat. No. 5,687,169 (issued Nov. 11, 1997) and co-pending application Ser. No. 08/761,602 (filed Dec. 6, 1996; attorney docket 1659.0340001) to Fullerton et al. These patent documents are incorporated herein by reference.

Figure 1:
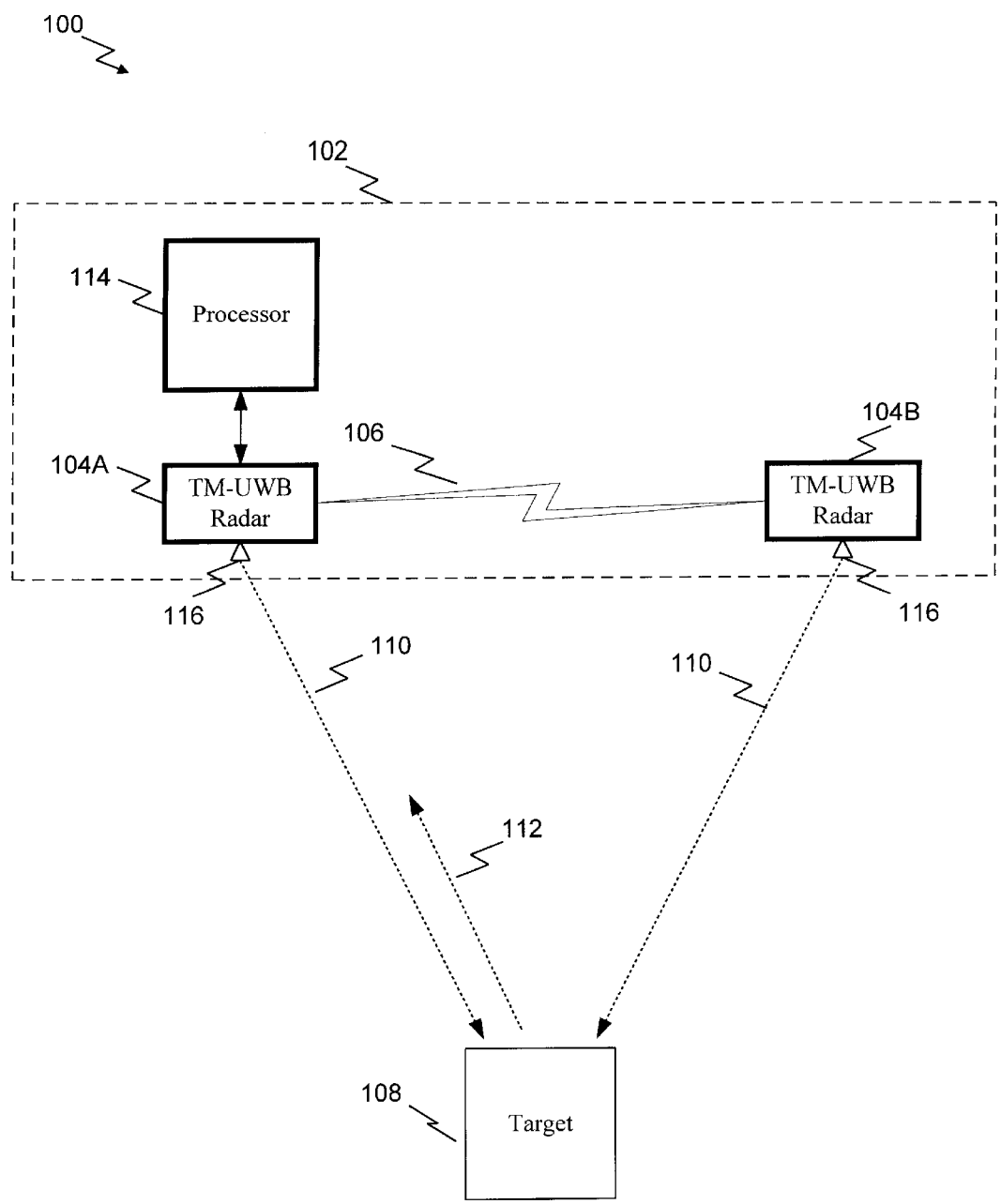
FIG. 1 illustrates a target environment within which the present invention is used.

FIG. 1 illustrates a target environment 100 within which the present invention is used. A TM-UWB radar array 102 illuminates a target 108 by transmitting ultra wideband (UWB) pulses 110, which reflect off target 108 and are received as signal returns 112. TM-UWB radar array 102 includes two or more TM-UWB radars illustrated at 104A and 104B (referred to collectively as 104), a processor 114, and a communication pathway 106. TM-UWB radars 104 transmit and receive UWB pulses and communicate with each other via communication pathway 106. Processor 114 performs, inter alia, various signal processing of signal returns 112 according to the function being performed by radar array 102 (e.g., imaging, motion detection, position or distance determination).

TM-UWB radar 104 is preferably implemented as described in U.S. Pat. Nos. 4,743,906, and 5,363,108, incorporated by reference above. However, those skilled in the art will recognize that the radar array concepts described herein apply equally well to other radars that transmit time modulated UWB pulses.

TM-UWB radars 104 transmit UWB pulses 110 and at least one receives signal returns 112, depending on the particular mode of operation (described below). Each TM-UWB radar 104 can utilize a single antenna element for both transmission and reception, separate antenna elements for transmission and reception, or even an array of antenna elements for transmission and reception, including phased arrays of antennas. Their antennas are shown generally at 116. Those skilled in the art will recognize that the number and type of antenna elements will vary based on the particular application and desired transmission characteristics. In a preferred embodiment, antenna 116 is implemented as a UWB magnetic antenna as described in commonly owned, co-pending U.S. patent application Ser. No. 6,091,374, entitled "Ultra-wideband Magnetic Antenna," which is incorporated herein by reference.

TM-UWB radar 104 preferably operates with a center frequency between 1 GHz and 3 GHz, and a pulse repetition rate of 1.25 MHz. Other center frequencies are possible, though hydrometer effects introduce atmospheric attenuation problems around 10 GHz and above. Similarly, the pulse repetition rate will vary based on the particular embodiment. Note also that if the time modulation of the UWB pulses includes a random component, pseudo-random noise (rather than true noise) is used so that the noise sequence can be reproduced at the other radars. A good discussion of time modulation using pseudo-random noise codes for impulse systems is found in U.S. Pat. No. 5,677,927 (hereafter the '927 patent), incorporated by reference above.

Processor 114 can be implemented using many different configurations of computer hardware and software, as is well known to those skilled in the art. Each particular application will dictate the processing needs of the system, size requirements, memory requirements, and other implementational details. Processor 114 is preferably physically located in close proximity to one of the radars 104, such that data may be transferred between processor 114 and the nearby radar via a cable. Alternatively, processor 114 can be physically distant from all TM-UWB radars 104 and communicate with one or more of them wirelessly.

Communication pathway 106 represents a wire or wireless transmission medium. In a preferred embodiment, TM-UWB radars 104 communicate with each other via a wireless link, wherein communication pathway 106 represents electromagnetic waves propagating through the environment. Alternatively, communication pathway 106 can be implemented as a cable (e.g., coaxial cable, optical fibre) connecting the radars.

Target 108 represents one or more objects, moving or motionless, which at least partially reflect UWB pulses. Target 108 will vary depending on the application. For example, in a building surveillance embodiment, target 108 could be one or more humans, furnishings, or interior walls within the building.

Radar Array Physical Configuration

Figure 2:
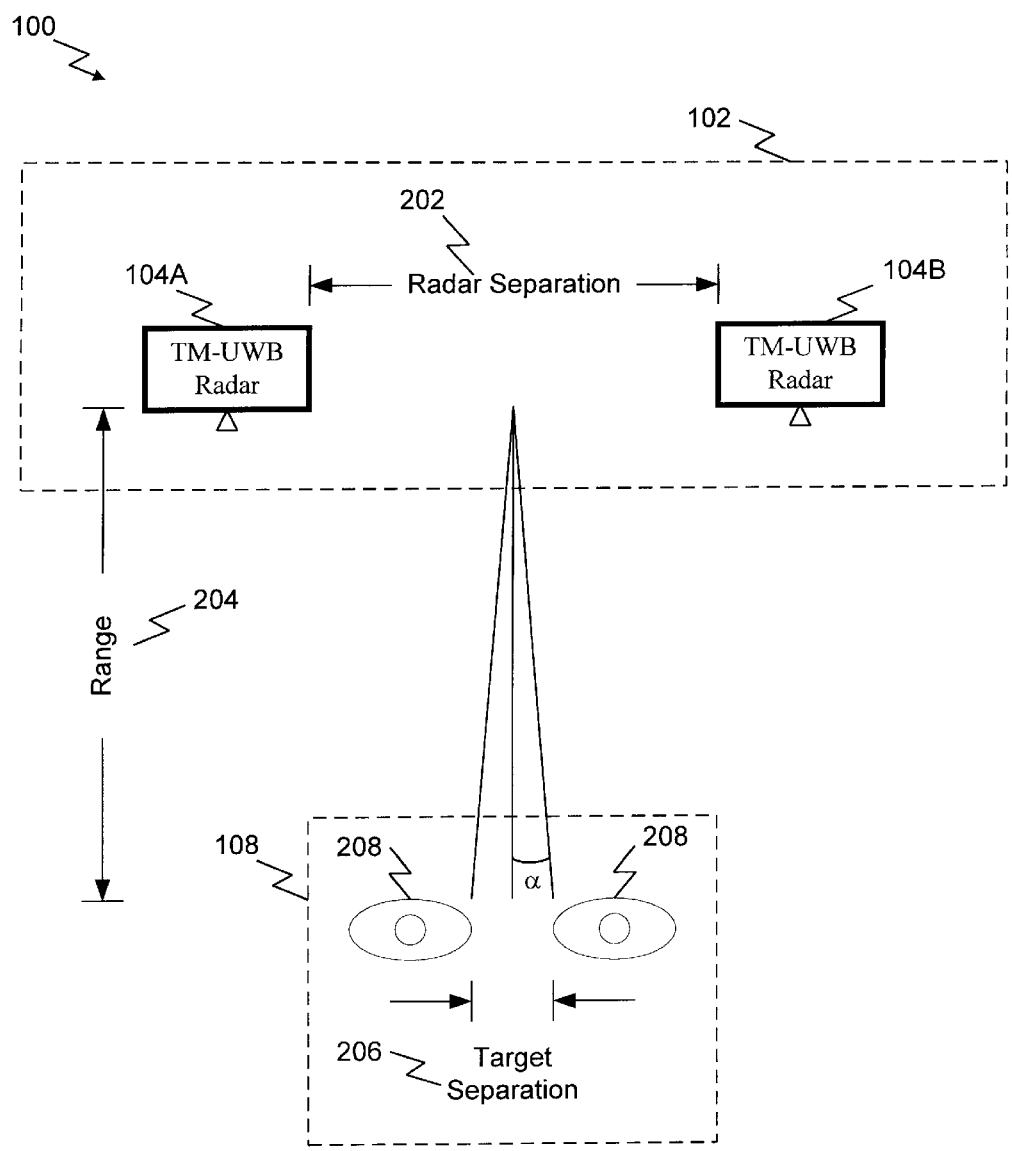
FIG. 2 depicts the target environment in greater detail.

FIG. 2 depicts target environment 100 in greater detail. The radars within TM-UWB radar array 102 are oriented generally in the direction of target 108, and separated by radar separation distance 202. Note that only two TM-UWB radars 104 are depicted in FIG. 2 for purposes of clarity. Those skilled in the art will recognize that the principles discussed herein are readily extensible to three or more TM-UWB radars 104, and that the spacing between them need not be constant. Furthermore, the radars within array 102 need not be aligned in a linear array as shown in FIG. 2, i.e., the radars may be positioned in any arbitrary configuration.

Target 108 is positioned down-range from TM-UWB radars 104 at a distance of range 204. For purposes of discussion, it shall be assumed that target 108 includes two objects 208 separated by a target separation 206. Angular resolution is quantified as the ability to resolve two objects 208, separated by target separation 206 at range 204, with radars having radar separation distance 202.

For example, consider the building surveillance embodiment described generally above. For this embodiment, radar array 102 preferably has the capability of resolving two objects 208 (e.g., humans) at range 204 of 100 yards with target separation 206 of one yard. In order to achieve this angular resolution, radar array 102 requires a half-power beamwidth (HPBW) of 0.6°, shown as α in FIG. 2. For TM-UWB radars 104 operating at a center frequency of 2 GHz, this translates into radar separation distance 202 of approximately 70 feet. Given this radar separation distance 202, TM-UWB radars 104 are preferably deployed in separate vehicles, such as a car and a van. In this embodiment, processor 114 preferably resides in one of the vehicles.

The following three sections describe different modes of operation of TM-UWB radar array 102. In all three modes, each TM-UWB radar 104 in radar array 102 transmits UWB pulses 110. The different modes vary based on which radars 104 are configured to receive signal returns 112, and whether the radars are synchronized for forward scattering measurements.

First Mode: Back Scattering at Each Radar and Forward Scattering

Figure 3:
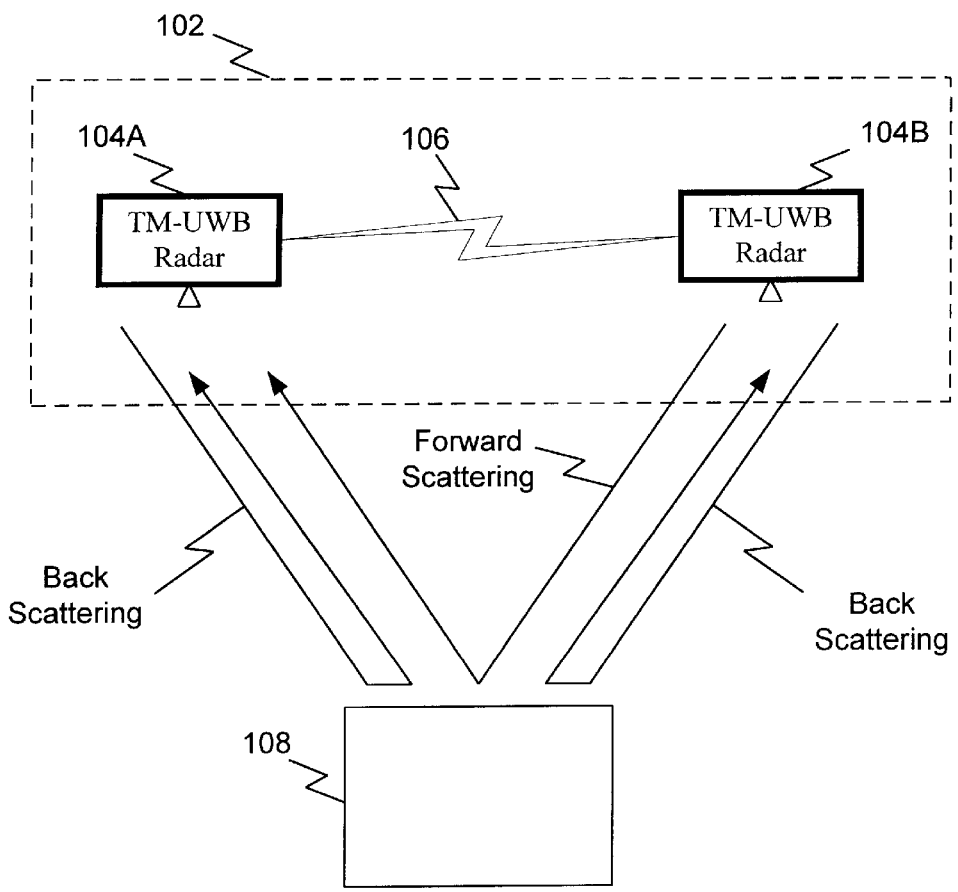
FIG. 3 depicts the TM-UWB radar array operating in a first mode including back scattering at each radar and forward scattering.

FIG. 3 depicts TM-UWB radar array 102 operating in the first mode. As shown, both TM-UWB radars 104 transmit UWB pulses and receive the corresponding signal returns. This process is known to those skilled in the art as back scattering, and is depicted in FIG. 3. The back scattering data from each radar 104 is passed to processor 114 (not shown in FIG. 3) for analysis. As mentioned above, processor 114 can be located in close physical proximity or connected wirelessly to any one or more of radars 104.

TM-UWB radar array 102 also performs forward scattering, which refers to a TM-UWB radar 104 receiving signal returns corresponding to UWB pulses transmitted by another radar 104. As shown in FIG. 3, radar 104A receives signal returns corresponding to UWB pulses transmitted by radar 104B. Radar 104B passes both back and forward scattering data on to processor 114. TM-UWB radars 104 must be synchronized in order to utilize the forward scattering data. This synchronization is preferably implemented across communication pathway 106.

Second Mode: Back Scattering at One Radar and Forward Scattering

Figure 4:
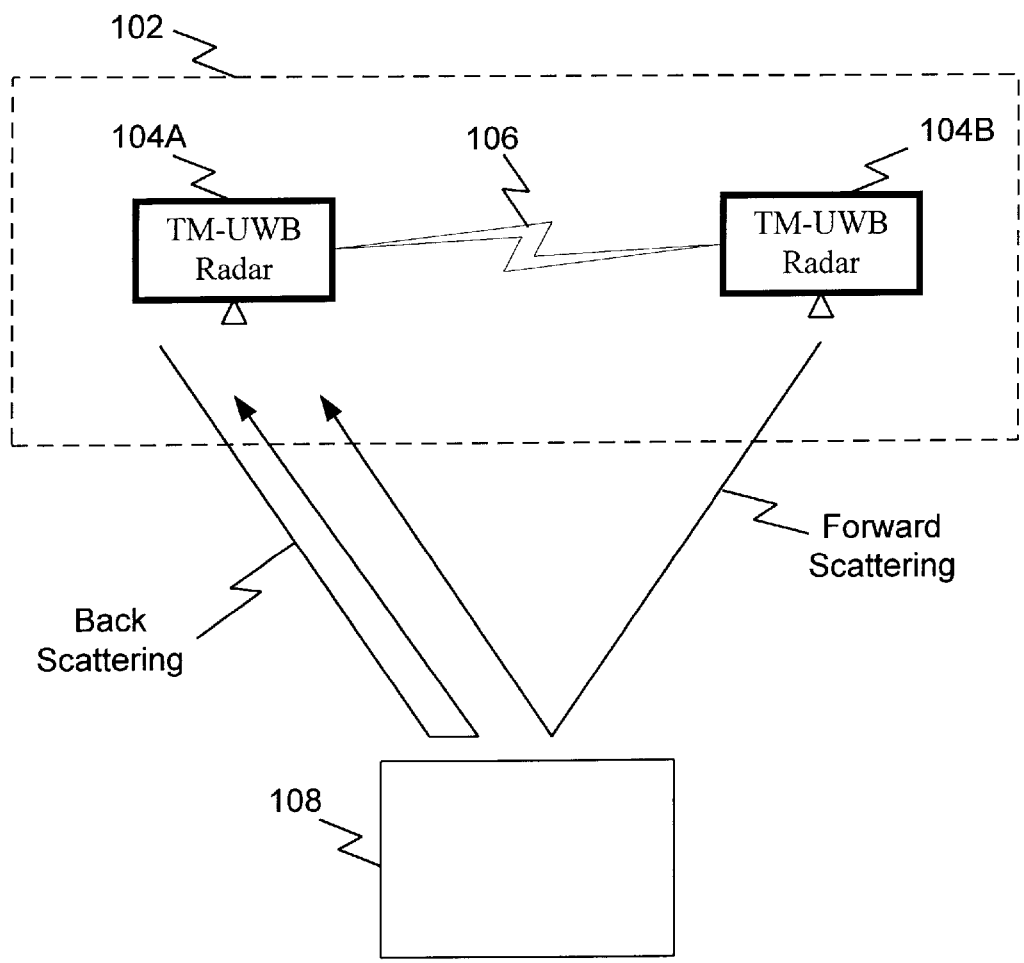
FIG. 4 depicts the TM-UWB radar array operating in a second mode including back scattering at one radar and forward scattering.

FIG. 4 depicts TM-UWB radar array 102 operating in the second mode. In this mode, certain of the radars 104 are used for forward scattering purposes only, i.e., they transmit UWB pulses which are received by other radars 104, but do not themselves receive any signal returns. For example, in FIG. 4, radar 104B transmits UWB pulses that are received by radar 104A, as indicated by the forward scattering propagation path. Radar 104A receives the forward scattering signal returns corresponding to UWB pulses transmitted by radar 104B, and also receives its own back scattering signal returns. If TM-UWB radar array 102 operates only in the second mode, radar 104B can be implemented in a more simple, inexpensive manner because it need only transmit, not receive.

Again, the radars must be synchronized, preferably across communication pathway 106, in order to utilize the forward scattering data. Note that in this mode, only the radar that receives signal returns passes data (both back and forward scattering data) to processor 114 (not shown in FIG. 4) for analysis.

Third Mode: Back Scattering Only

Figure 5:
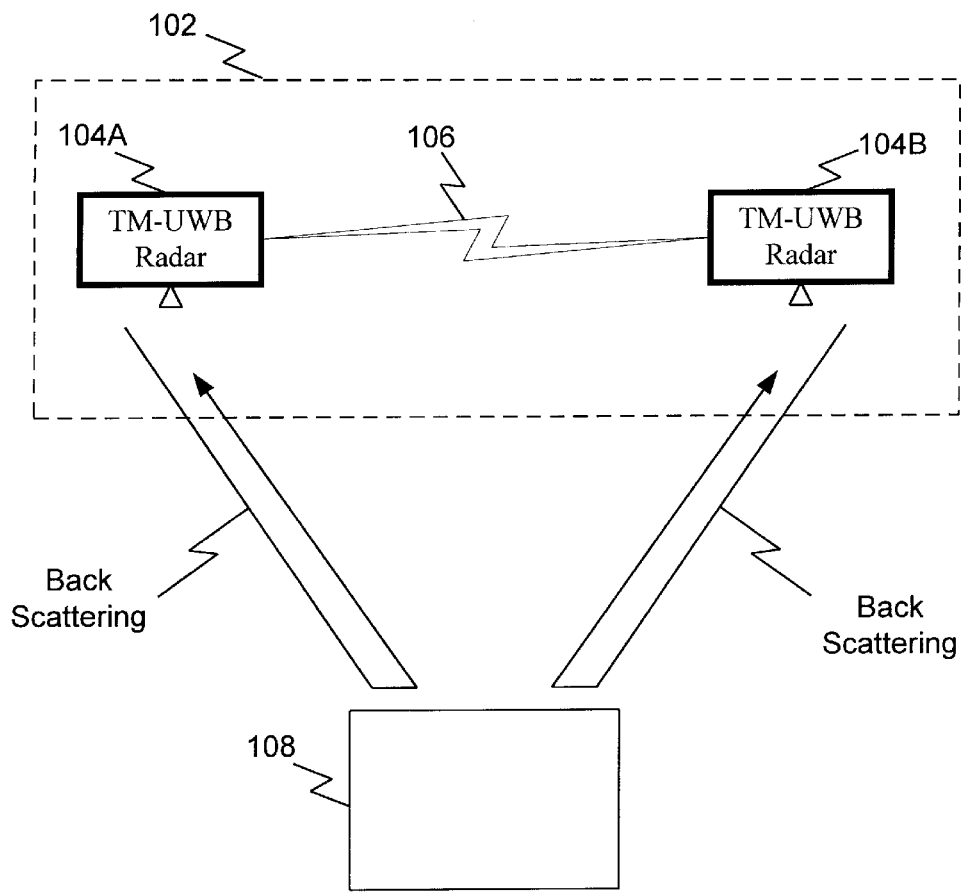
FIG. 5 depicts the TM-UWB radar array operating in a third mode including back scattering only.

FIG. 5 depicts TM-UWB radar array 102 operating in the third mode. In this mode, all of the radars 104 in radar array 102 collect back scattering data only. As shown in FIG. 5, each radar 102 transmits UWB pulses and receives the corresponding signal returns. The back scattering data collected by each radar 102 is passed on to processor 114 (not shown in FIG. 5) for analysis. Note that in this mode, there is no requirement that the radars 102 be synchronized because forward scattering data is not being collected.

System Components

Figure 6:
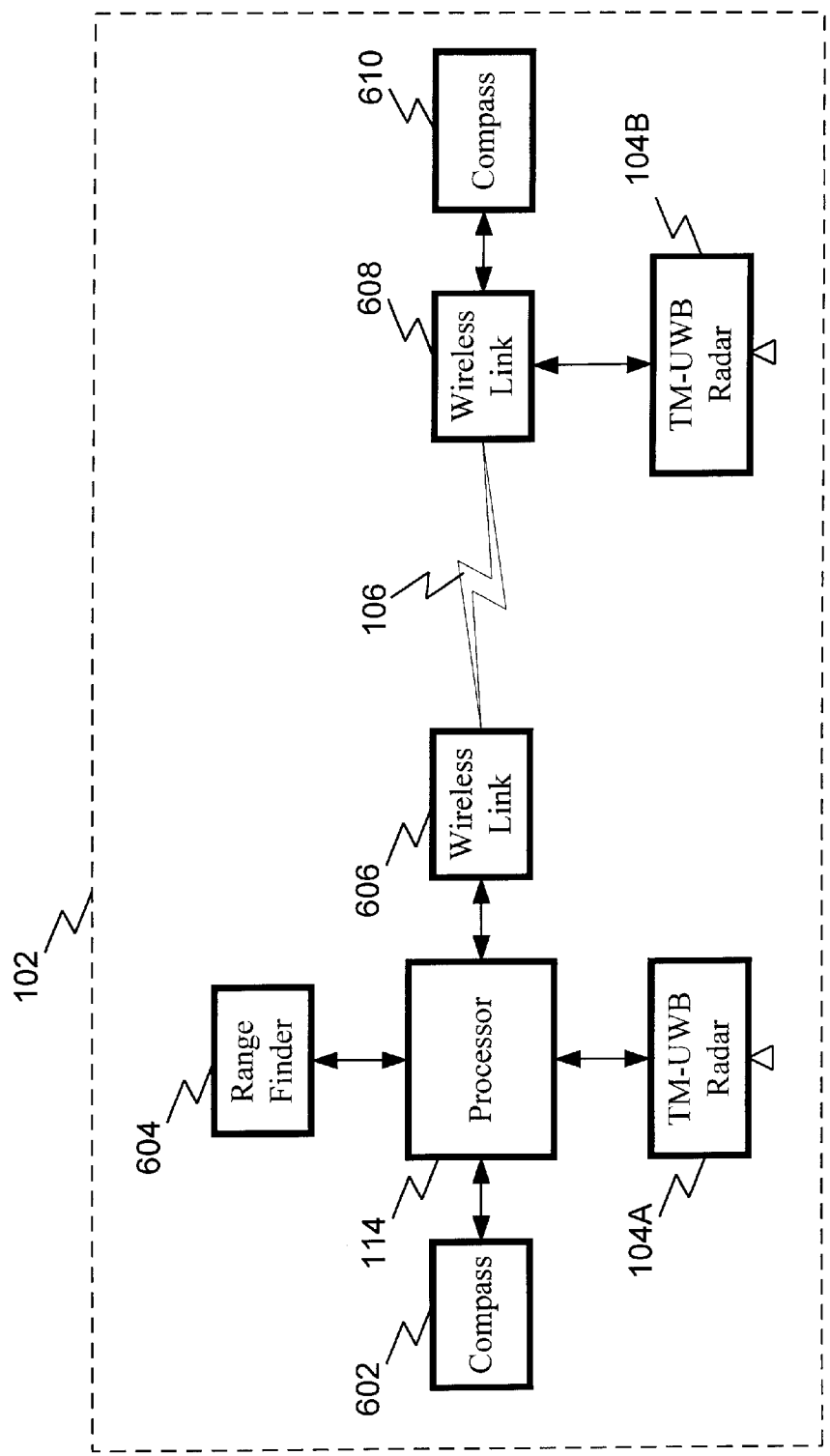
FIG. 6 depicts the system components of the TM-UWB radar array in greater detail.

FIG. 6 depicts the system components of TM-UWB radar array 102 in greater detail. As shown in FIG. 6, each TM-UWB radar 104 has associated with it a compass (602 and 610) and a wireless link (606 and 608). Furthermore, at least one radar 104 has associated with it a range finder 604 (e.g., radar 104A as shown in FIG. 6). Those components associated with each radar 104 are preferably located in close proximity, e.g., sufficiently close to be connected via cable. In the building surveillance embodiment, the components associated with a particular radar 104 are all preferably located within the same vehicle.

Compass 602 determines the directional orientation of the radar 104 with which it is associated. Directional orientation of a radar 104 is used herein to refer to a description of radiated power as a function of direction-of-look. Each particular application will determine the amount of orientation information required. For some applications, an indication of the orientation of the radar antenna's main lobe is sufficient. Other applications could require a more detailed description of the radar antenna's beam pattern.

Those skilled in the art will recognize that the directional orientation of a radar 104 can depend on many factors. For instance, the directional orientation of a radar 104 having a single antenna can be determined given the transmission characteristics of the antenna and the physical orientation of the antenna. Here, a conventional electronic compass affixed to radar 104 and having a computer interface is preferably used to determine directional orientation. In an alternative embodiment, Global Positioning System (GPS) sensors can be used to determine directional orientation. In this embodiment, one GPS sensor can be used to determine orientation if the radar is moving, or multiple GPS sensors can be used where the radar is still. Alternatively still, the directional orientation of a radar having multiple antennas will depend on the particular antenna configuration and the beamforming technique (if any) being used. Here, the compass could be implemented as a combination of hardware and software to measure the resulting beam pattern.

Range finder 604 determines the distance between the radar associated with range finder 604 and other radars in radar array 102, depicted as radar separation distance 202 in FIG. 2. As will be discussed below, radar separation distance 202 is used by processor 114 in certain embodiments as a geographic reference when analyzing scattering data. Range finder 604 can be implemented using any "off-the-shelf" conventional range finder device, such as an optical range finder or a differential GPS system. Other alternative embodiments using TM-UWB radars are discussed below.

Wireless links 606 and 608 provide for wireless communication between TM-UWB radars 104 via communication pathway 106. Wireless links can be implemented as any number of conventional devices known to those skilled in the art, depending upon the bandwidth required by the particular application. However, wireless links 606 and 608 are preferably implemented using impulse radio technology as described, for example, in the '927 patent. Note that wireless links 606 and 608 are unnecessary for those embodiments employing a cable as communication pathway 106.

Wireless links 606 and 608 are responsible for, inter alia, transmitting scattering data received by their associated radars 104, exchanging synchronization information when forward scattering data is being taken, and transmitting compass data to processor 114. Note that when TM-UWB array 102 operates in the second mode, described above, communication only needs to proceed in one direction, i.e., from radar 104A to radar 104B. Therefore, for embodiments only operating in the second mode, wireless link 608 can be implemented as a receiver only.

The bandwidth requirements for wireless links 606 and 608 depend upon the types of data analysis performed by processor 114, the rate at which TM-UWB radar 104 transmits UWB pulses 110, and various other factors. For example, in the building surveillance embodiment, a minimum bandwidth of approximately 500 Kbps (kilobits per second) is required for downloading data from the car to the van. Wireless links 606 and 608 can also be either bidirectional or simplex, depending upon the requirements of the application. Those skilled in the art will recognize the cost to benefit tradeoff associated with conventional wireless implementations. Other implementations are discussed below.

FIG. 6 depicts processor 114 as being directly connected to radar 104A and connected to radar 104B via wireless links 606. However, as mentioned above, other configurations of processor 114 are possible. In an alternative embodiment, processor 114 might be physically distant from all the radars 104 with all communications occurring via wireless links. This embodiment would be advantageous where a large processing unit 114 is kept in a central location, e.g., a van, with radars 104 being carried by hand to an appropriate position for proper illumination of target 108.

Operation of the Current Invention

Figure 7:
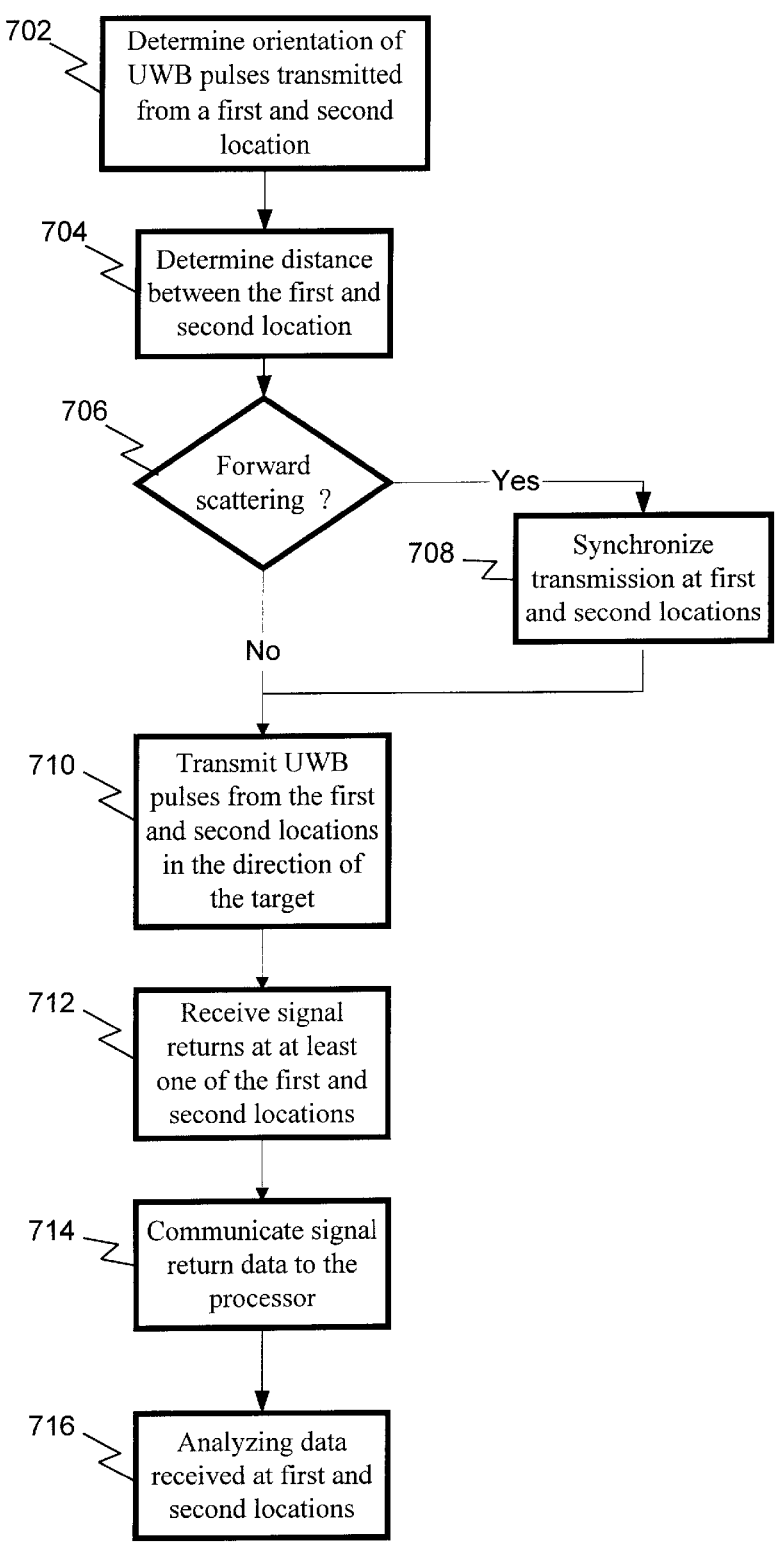
FIG. 7 is a flowchart that describes the operation of the TM-UWB radar array.

FIG. 7 is a flowchart that describes the operation of the current invention. In step 702, each compass determines the orientation of UWB pulses transmitted by its associated TM-UWB radar 104. This orientation data is communicated to processor 114 for use in analyzing signal return data. For example, with respect to the embodiment depicted in FIG. 6, compass 602 determines the orientation of UWB pulses transmitted by radar 104A, and communicates this orientation data to processor 114. Similarly, compass 610 determines the orientation of radar 104B, and communicates this orientation data to processor 114 via wireless links 608 and 606.

In step 704, range finder 604 determines the distance between the radars, depicted as radar separation distance 202 in FIG. 2, and communicates this data to processor 114 for use in analyzing the signal return data.

In step 706, control flow proceeds to step 708 only for those embodiments which include forward scattering measurements (e.g., the first and second modes). In step 708, radars 104 are synchronized such that the time of transmission of UWB pulses is known to the radar 104 receiving the forward scattering signal returns. Skilled artisans will recognize that this synchronization allows for useful analysis of the scattering data.

Synchronizing radars 104 can be accomplished in at least two different ways. In a first embodiment, a synchronization signal is transmitted between radars 104 via wireless links 606 and 608. In this embodiment, wireless links 606 and 608 are chosen which have high temporal resolution, on the order of ten picoseconds. This resolution is necessary to achieve the desired synchronization.

In a second embodiment, radar 104A receives UWB pulses transmitted by radar 104B via two paths. As described above, radar 104A receives forward scattering signal returns that reflect off target 108. However, radar 104A can also receive UWB pulses that travel directly from radar 104B to radar 104A. These UWB pulses can be used by radar 104A for synchronization, so long as the distance between the radars is known. Those skilled in the art will recognize that antenna 116 associated with radar 104B must be chosen such that its beam pattern provides for sufficient transmission in the direction of radar 104A.

In step 710, each of the radars 104 transmits UWB pulses in the direction of target 108. Proper operation of the current invention assumes that each radar 104 is positioned, either physically or electronically, such that target 108 is illuminated. In a preferred embodiment, processor 114 causes an alarm to be triggered/sounded whenever the orientation data from any radar 104 indicates that target 108 is not satisfactorily illuminated. Alternatively, a control loop with feedback can be included to automatically re-align radars 104 until target 108 is sufficiently illuminated. This automatic system can be implemented, for example, in dedicated hardware or software running on processor 114.

In step 712, signal returns are received by at least one radar 104, depending upon the array's mode of operation, as described above. In the first mode, radar 104A receives both back and forward scattering signal returns, while radar 104B receives only back scattering signal returns. In the second mode, radar 104A receives both back and forward scattering signal returns, while radar 104B does not receive any signal returns (i.e., radar 104B is a transmitter only). In the third mode, radars 104A and 104B both receive back scattering signal returns.

In step 714, signal return data collected by the radars 104 is communicated to processor 114. The manner in which the data is communicated depends upon the particular embodiment. For instance, in FIG. 6, signal return data collected at radar 104A is passed directly to processor 114 via a local connection (e.g., a cable), whereas data collected at radar 104B is transmitted to processor 114 via wireless links 608 and 606. Those skilled in the art will recognize that many alternative arrangements are possible for communicating signal return data to processor 114, depending upon the particular embodiment.

In step 716, processor 114 analyzes the signal return data collected by radars 104, along with the orientation data and the range data, according to the goals of a particular embodiment. This analysis is described in the following section.

Analysis of Signal Return Data

The particular application in which radar array 102 is used will dictate how the signal return data is processed in step 716. For example, in the building surveillance embodiment described above, radar array 102 performs radar imaging of target 108. Other embodiments are also contemplated by the current invention, including motion detection and combined imaging/motion detection. Those skilled in the art will recognize that various techniques are available for processing signal return data for many different applications.

Figure 8:
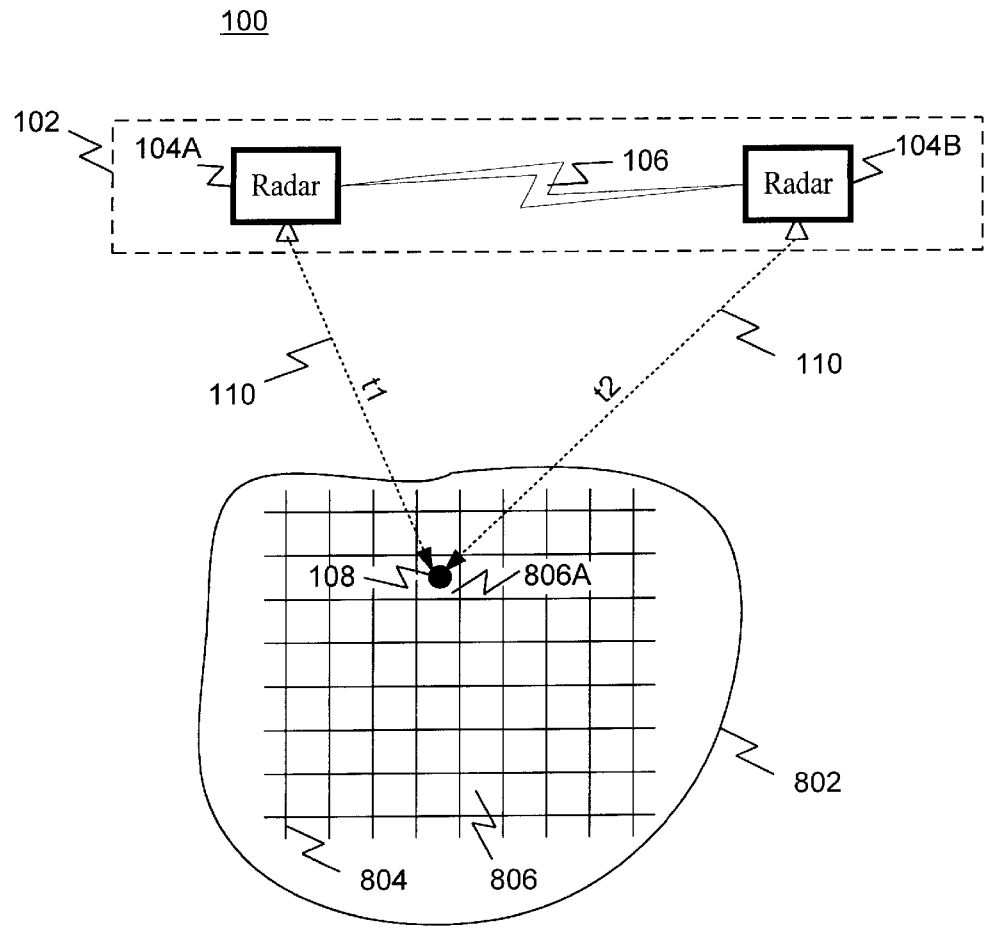
FIG. 8 depicts the TM-UWB radar array in an example radar imaging application.

FIG. 8 depicts TM-UWB radar array 102 in an example target environment for purposes of illustrating the analysis of back scattering data (and forward scattering, where available) to generate an image of target 108. Here, radar array 102 includes radars 104A and 104B, and target 108 positioned as shown. FIG. 8 also depicts an imaging area 802 that defines an example area to be imaged. Imaging area 802 could, for example, represent the interior of a building. A grid 804 criss-crosses imaging area 802, defining one or more voxels 806 (a voxel is a minimum resolution portion of a three dimensional space, comparable to a pixel in two dimensional space). As described below, processor 114 calculates a value for each voxel 806 indicative of the reflected energy measured in the portion of imaging area defined by that voxel. Processor 114 displays imaging area 802 according to computer graphics techniques well known to those skilled in the art.

Grid 804 is maintained in processor 114, and can vary in spacing to define voxels 806 having different resolution (grid 804 need not be orthogonal). Decreasing the grid spacing, increases the resolution of the generated image. As shown in FIG. 8, target 108 occupies a single voxel 806A. Though this simplifies the discussion, skilled artisans will recognize that in practice a higher resolution will often be desired.

Figure 9:
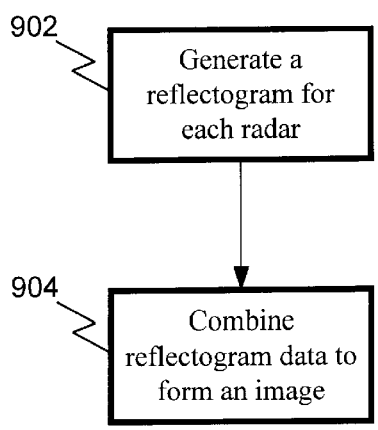
FIG. 9 is a flowchart that describes analyzing signal return data for a radar imaging application.
Figure 10:
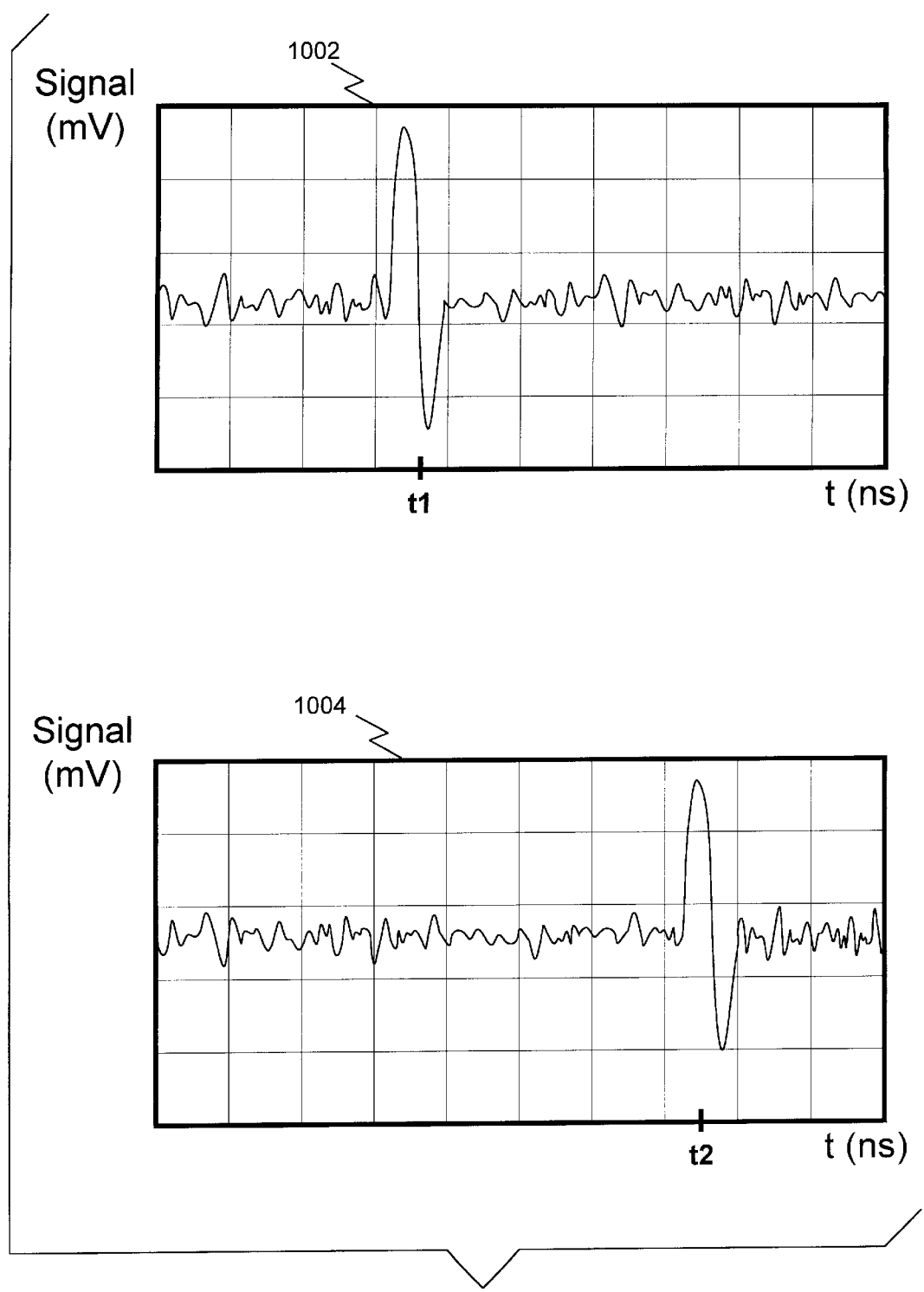
FIG. 10 depicts example reflectograms for two TM-UWB radars.

FIG. 9 depicts step 716 in greater detail according to a preferred time domain interferometry technique for calculating a value for each voxel 806 in imaging area 802. In step 902, a reflectogram is generated for each radar 104 in radar array 102. FIG. 10 depicts two example reflectograms, 1002 and 1004. Skilled artisans will recognize that a reflectogram describes reflected energy as a function of range (i.e., distance from the transmitting antenna). For example, reflectogram 1002 describes the reflected energy measured at radar 104A, whereas reflectogram 1004 describes the reflected energy measured at radar 104B. The x-axis represents range, while the y-axis represents reflected energy measured as voltage.

In a preferred embodiment, each radar 104 generates a reflectogram by sweeping through the ranges of interest, measuring reflected energy at discrete ranges. At each discrete range, radar 104 transmits one or more ultra wideband pulses 110 and then looks for reflected energy after a time delay corresponding to the return time-of-flight. Further details regarding the operation of radar 104 are provided in U.S. Pat. Nos. 4,743,906, and 5,363,108, incorporated by reference above. Radar 104 receives and, where multiple pulses are transmitted for each discrete range step, accumulates reflected energy.

Those skilled in the art will recognize that more reflected energy will be measured per transmitted pulse 110 for nearby targets, as compared to those targets positioned farther away. Compensating for this effect allows for more efficient use of the radar's dynamic range. In a preferred embodiment, radar 104 transmits and receives an increasing number of pulses per discrete range step as the range is increased. The reflected energy measured at longer ranges is therefore increased by receiving and integrating a greater number of pulses. The ranges of interest are preferably divided into multiple "range windows," where the same number of pulses is transmitted for each discrete range within a given window. Skilled artisans will recognize that this is only one example of how this compensation might be implemented.

Alternatively, the power of transmitted pulses 110 can be varied according to range. In this embodiment, radar 104 increases the power of transmitted pulses 110 as the range gets longer. This alternative compensation has a similar effect to varying the number of transmitted pulses, but will likely require more costly modifications to the basic radar 104 to implement. This, and other related concepts are described in U.S. patent application Ser. No. 09/332,501, entitled "System and Method for Impulse Power Control", filed the same day as this application, Jun. 14, 1999, which is incorporated herein by reference.

Returning to FIG. 9, in step 904 an image is formed by selectively combining data from the reflectograms generated in step 902. An image value is calculated for each voxel 806, where the image value is indicative of the total amount of reflected energy measured over that portion of imaging area 802. Processor 114 preferably calculates an image value for each voxel 806 by summing voltage values from the reflectogram associated with each radar 104, where the voltage values correspond to the return time-of-flight from the radar to the voxel being calculated. For example, referring to FIG. 8, the image value for voxel 806A is the sum of a voltage value from reflectograms 1002 and 1004 corresponding to the return time-of-flight. As shown in reflectogram 1002, the voltage value at time t1 corresponds to the return time-of-flight from radar 104A to voxel 806A, as shown in FIG. 8. Similarly, time t2 corresponds to the return time-of-flight from radar 104B to voxel 806A, as shown in reflectogram 1004 and FIG. 8. The sum of these two values forms the image value for voxel 806A.

In this manner the image value for each voxel 806 in image area 802 is calculated as the sum of a voltage from each reflectogram corresponding to the return time-of-flight.

Alternative Embodiments Using Time Modulated Ultra Wideband Radios

Figure 11:
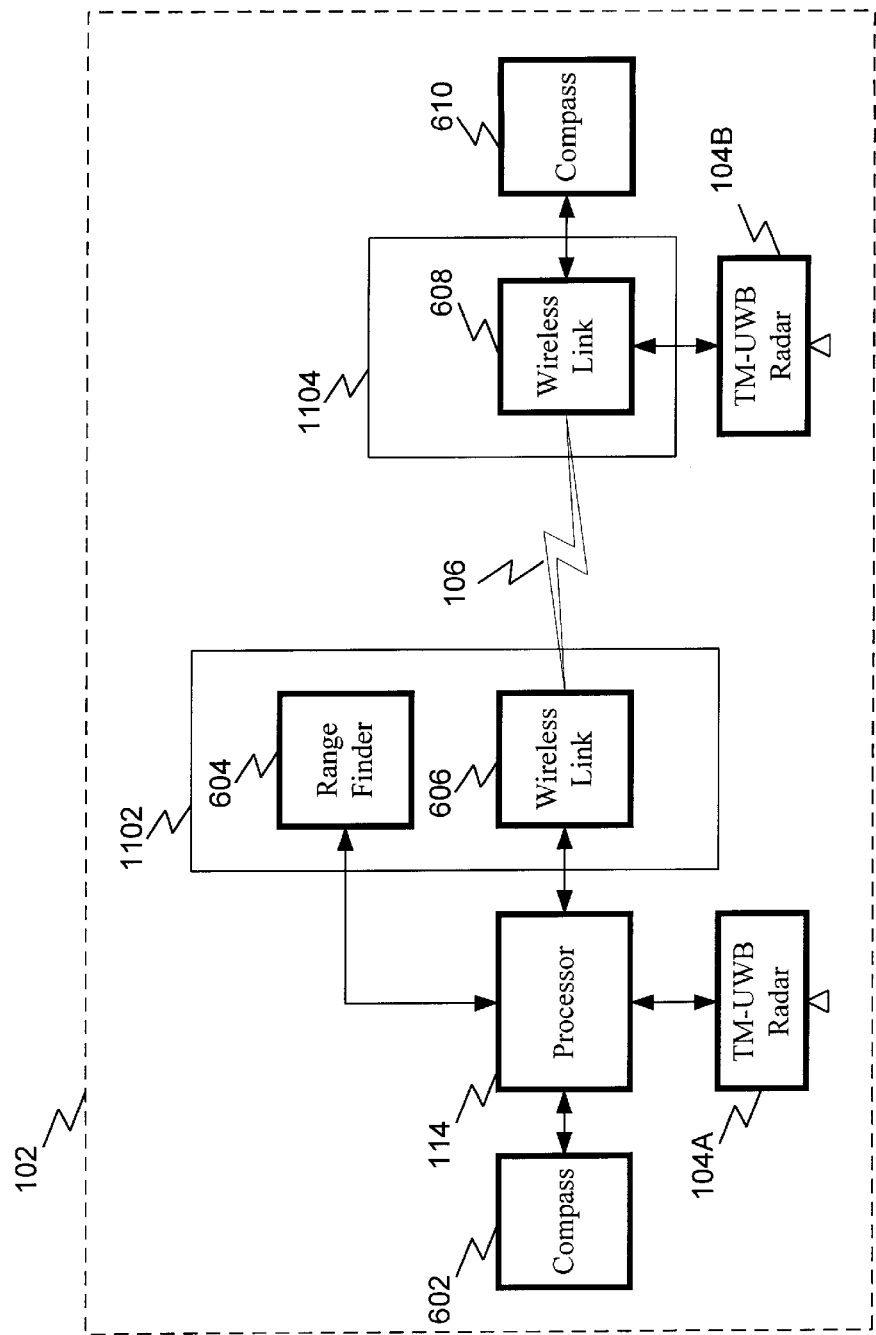
FIG. 11 depicts an alternative embodiment of the TM-UWB radar array utilizing additional TM-UWB radars to perform range finding and inter-radar communications.

FIG. 11 depicts an alternative embodiment of TM-UWB radar array 102. In this embodiment, TM-UWB radios, as described in U.S. Pat. Nos. 4,743,906, and 5,363,108, incorporated by reference above, perform the functions of range finder 604 and wireless links 606 and 608. Referring to FIG. 11, this embodiment includes a first TM-UWB radio 1102 associated with radar 104A and a second TM-UWB radio 1104 associated with radar 104B.

Radio 1102 performs the functions described above with respect to range finder 604 and wireless link 606. That is, rather than implementing range finder 604 and wireless link 606 using two conventional devices, a single TM-UWB radio is used to perform both functions. One alternative embodiment for adapting radio 1102 to perform range finding is described in commonly owned, co-pending U.S. patent application Ser. No. 09/045,929, attorney docket no. 1659.0470000, filed Mar 23. 1998, entitled "System and Method For Position Determination By Impulse Radio," which is incorporated herein by reference. Another alternative embodiment for adapting radio 1102 to perform range finding is described in commonly owned, co-pending U.S. patent application Ser. No. 09/083,993, attorney docket no. 1659.0660000, filed May 26, 1998, entitled "System and Method For Distance Measurement by Inphase and Quadrature Signals In A Radio System," which is also incorporated herein by reference. Skilled artisans will recognize the efficiencies resulting from such an arrangement.

Radio 1104 performs the functions described above with respect to wireless link 608. Radio 1104 therefore establishes communications pathway 106 as a wireless communication link with radio 1102. In a preferred embodiment, data transfers are accomplished using subcarrier modulation as described in the '927 patent, incorporated by reference above.

Figure 12:
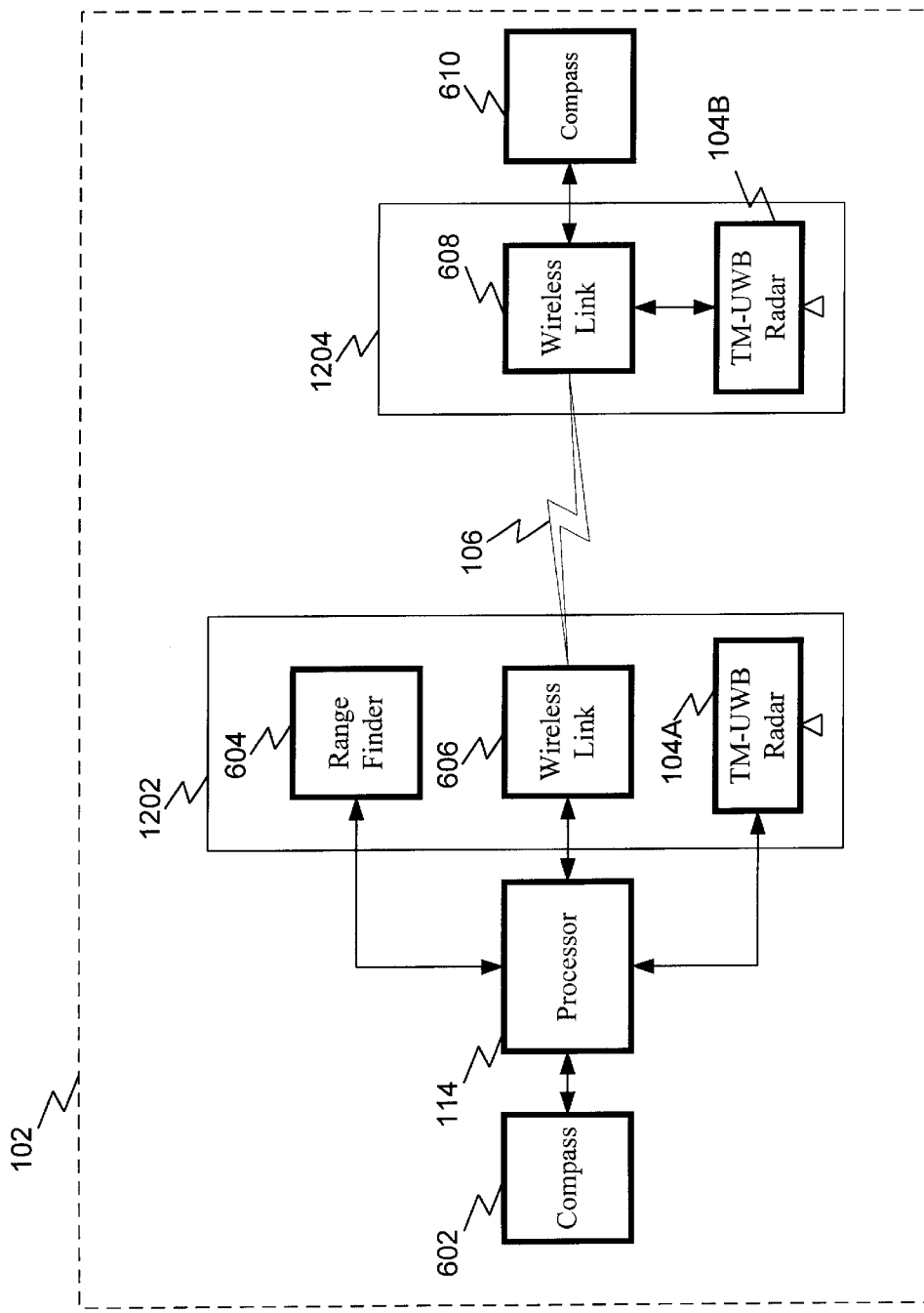
FIG. 12 depicts another alternative embodiment of the TM-UWB radar array utilizing a single TM-UWB radar at each location.

FIG. 12 depicts another alternative embodiment of TM-UWB radar array 102, which also employs TM-UWB radars to perform multiple functions. A first TM-UWB radar 1202 performs the functions described above with respect to range finder 604, wireless link 606, and TM-UWB radar 104A. In other words, a single TM-UWB radar is used at each location in radar array 102 to transmit radar pulses in the direction of target 108, communicate wirelessly with other radars in radar array 102, and to determine the distance separating the radars in array 102.

Similarly, a single TM-UWB radar 1204 performs the functions described above with respect to wireless link 608 and TM-UWB radar 104B. Radar 1204 transmits UWB pulses in the direction of target 108 and communicates wirelessly with radar 1202. Combining these functions into single radars results in less expensive implementations. Further, in modes which include forward scattering, synchronization between the radars is achieved without requiring a separate synchronization signal.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A radar system comprising:

a first time modulated ultra wideband (TM-UWB) radar, wherein said first TM-UWB radar is adapted to transmit UWB pulses toward a target and receive first signal returns, adapted to provide a wireless communications link with a second TM-UWB radar, and adapted to determine a distance between said first TM-UWB radar and said second TM-UWB radar, and wherein said UWB pulses have a wavelength corresponding to the center frequency of said UWB pulses, said second TM-UWB radar, spaced said distance from said first TM-UWB radar, wherein said second TM-UWB radar is adapted to transmit further UWB pulses toward said target and receive second signal returns, and adapted to provided a wireless communications link with said first TM-UWB radar, wherein said further UWB pulses have said wavelength, wherein said second TM-UWB radar transmits said second signal returns to said first TM-UWB radar via said wireless communications link that is provide by said first and second TM-UWB radars; and a processor in communications with said first TM-UWB radar, wherein said processor generates an image of said target based on said first and second signal returns and said distance between said first TM-UWB radar and said second TM-UWB radar.

2. The radar system of claim 1, wherein said processor detects motion of said target based on said first and second signal returns.

* * * * *